US011663632B2

(12) United States Patent
Baik et al.

(10) Patent No.: US 11,663,632 B2
(45) Date of Patent: May 30, 2023

(54) NETWORK SERVER AND METHOD FOR PROVIDING WEB PAGES TO USER TERMINALS

(71) Applicants: NHN CORPORATION, Gyeonggi-do (KR); NHN AD CORPORATION, Gyeonggi-do (KR)

(72) Inventors: Sunha Baik, Gyeonggi-do (KR); Jichan Yoo, Gyeonggi-do (KR); Dong Ju Shin, Gyeonggi-do (KR)

(73) Assignees: NHN CORPORATION, Gyeonggi-Do (KR); NHN AD CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/079,209

(22) Filed: Oct. 23, 2020

(65) Prior Publication Data

US 2021/0125235 A1    Apr. 29, 2021

(30) Foreign Application Priority Data

Oct. 24, 2019    (KR) ................. 10-2019-0132847

(51) Int. Cl.
*G06Q 30/02* (2023.01)
*G06Q 30/0251* (2023.01)
*G06Q 30/0601* (2023.01)

(52) U.S. Cl.
CPC ..... *G06Q 30/0271* (2013.01); *G06Q 30/0267* (2013.01); *G06Q 30/0281* (2013.01); *G06Q 30/0643* (2013.01)

(58) Field of Classification Search
CPC ................................................ G06Q 30/02
See application file for complete search history.

(56) References Cited

U.S. PATENT DOCUMENTS

2002/0143661 A1* 10/2002 Tumulty ............ G06Q 10/0637
                                                        705/14.1
2005/0251444 A1* 11/2005 Varian ................ G06Q 30/0263
                                                        705/14.46

(Continued)

FOREIGN PATENT DOCUMENTS

CN    105976203 A  *  9/2016  ............. G06Q 30/02
CN    109919651       6/2019

(Continued)

OTHER PUBLICATIONS

Office Action dated Jan. 20, 2021 for Korean Patent Application No. 10-2019-0132847 and its English machine translation by Google Translate.

(Continued)

*Primary Examiner* — Vincent M Cao
(74) *Attorney, Agent, or Firm* — Ladas & Parry, LLP

(57) ABSTRACT

A network server for providing web pages to user terminals which access through user identifications (IDs) may include: a communicator connected to a network; and a processor configured to communicate with the user terminals through the communicator. The processor may be configured to score first convertibility points corresponding to the respective user IDs, according to whether actions of the user terminals on the web pages are matched with predetermined user events, select one of the plurality of message types according to whether the first convertibility point of one user ID among the user IDs is higher than a threshold value, when the one user ID accesses through a user terminal, and provide the selected message type including the selected object to the user terminal of the one user ID.

13 Claims, 13 Drawing Sheets

(56) References Cited

U.S. PATENT DOCUMENTS

| | | | |
|---|---|---|---|
| 2008/0040175 A1* | 2/2008 | Dellovo | G06Q 30/0242 705/7.36 |
| 2008/0140476 A1* | 6/2008 | Anand | G06Q 30/0267 705/14.43 |
| 2011/0166926 A1* | 7/2011 | Lv | G06Q 30/0246 705/14.45 |
| 2011/0295689 A1* | 12/2011 | Brady | G06Q 30/0241 705/14.54 |
| 2013/0254329 A1 | 9/2013 | Lin et al. | |
| 2014/0122232 A1* | 5/2014 | Press | G06Q 30/0256 705/14.54 |
| 2014/0344035 A1* | 11/2014 | Hewett | G06Q 30/0211 705/14.13 |
| 2014/0351046 A1* | 11/2014 | Carlyle | G06Q 30/0255 705/14.53 |
| 2015/0006286 A1* | 1/2015 | Liu | G06Q 30/0269 705/14.53 |
| 2015/0206169 A1* | 7/2015 | Ye | G06Q 30/0242 705/14.41 |
| 2015/0339754 A1* | 11/2015 | Bloem | G06F 16/9535 705/26.7 |
| 2018/0189823 A1* | 7/2018 | Xie | G06Q 30/0246 |
| 2019/0034976 A1* | 1/2019 | Hamedi | G06Q 30/0204 |

FOREIGN PATENT DOCUMENTS

| | | |
|---|---|---|
| JP | 2013-537339 | 9/2013 |
| KR | 10-2013-0082882 | 7/2013 |
| KR | 10-1863541 | 6/2018 |

OTHER PUBLICATIONS

Office Action dated Oct. 5, 2021 for Japanese Patent Application No. 2020-177642 and its English translation provided by Applicant's foreign counsel.

* cited by examiner

| MT1 | MCVR11 | MCVR21 |
| --- | --- | --- |
| MT2 | MCVR12 | MCVR22 |
| MT3 | MCVR13 | MCVR23 |

NETWORK SERVER AND METHOD FOR PROVIDING WEB PAGES TO USER TERMINALS

CROSS REFERENCE TO RELATED APPLICATION

This application claims priority from and the benefits of Korean Patent Application No. 10-2019-0132847, filed on Oct. 24, 2019, which are hereby incorporated by reference for all purposes as if fully set forth herein.

BACKGROUND

1. Technical Field

The present disclosure generally relates to devices and/or servers connected to a network, and more particularly, to a network server and method for providing web pages to user terminals connected to a network.

2. Related Art

Recently, the development of a data communication network has enabled more people to use the Internet. With the increase in use of the Internet, online shopping mall services using the Internet are provided. Such a online shopping mall service not only enables a user to conveniently compare various products, but also supports delivery of a product to a location desired by the user. Thus, the growth rate of the online shopping mall service is continuously increasing.

The foregoing is intended merely to aid in the understanding of the background of the technical idea of the present disclosure, and is not intended to mean that the present disclosure falls within the purview of the related art that is already known to those skilled in the art.

SUMMARY

A mall server, which provides a shopping mall service through communication with a user terminal, may provide web pages including various product photographs and information associated with the product photographs, and a user of the user terminal decides whether to purchase a product based on the information on the web pages.

In order to increase a purchase need by providing more pieces of information to a user, the web pages provided to the user may include advertisement messages. Such an advertisement message may include a photograph of the corresponding product and/or information associated with the product photograph. When the user clicks the advertisement message, the user may move to a web page to purchase the corresponding product or a web page including detailed photographs and detailed information of the corresponding product. If such an advertisement message is irrelevant to a user or has low relation with the user, an advertisement effect through the advertisement message relatively decreases.

Various embodiments of the present disclosure are directed to a mall server and method capable of improving an advertisement effect by providing adaptive recommendation messages to user terminals.

In an embodiment, there is provided a network server for providing web pages to user terminals which access through user identifications (IDs). The network server may include: a communicator connected to a network; and a processor configured to communicate with the user terminals through the communicator. The processor may be configured to store objects associated with products on sale in a database, store a plurality of message types having different graphic interfaces in the database, wherein each of the message types has a layout including one or more of the objects, provide the user terminals with web pages including at least some of the objects, score first convertibility points corresponding to the respective user IDs, according to whether actions of the user terminals on the web pages are matched with predetermined user events, store or update the first convertibility points in the database, select any one of the plurality of message types according to whether the first convertibility point of a first user ID among the user IDs is higher than a threshold value, when the first user ID accesses through a user terminal, include an object, selected among the objects, in the layout of the selected message type, and provide the selected message type including the selected object to the user terminal of the first user ID.

The plurality of message types may include different texts.

The processor may be configured to score second convertibility scores corresponding to the respective objects based on the actions of the user terminals, and store or update the second convertibility points into the database.

The processor may be configured to select candidate objects among the objects, list the candidate objects according to the second convertibility points, and include at least some of the listed candidate objects as the selected object in the layout of the selected message type.

The processor may be configured to select at least one of the objects by referring to the second convertibility points, and include the selected object in the layout of the selected message type.

The processor may be configured to provide the plurality of message types to the user terminals, wherein the plurality of message types include at least some of the objects, and score third convertibility points corresponding to the respective message types by tracking actions of the user terminals, associated with the plurality of message types.

The processor may be configured to select the message type having the highest third convertibility point, among the plurality of message types, as the any one of the plurality of message types, when the first convertibility point of the first user ID is higher than the threshold value.

The processor may be configured to select the message type having the highest third convertibility point, among the plurality of message types, as the any one of the plurality of message types, when the first convertibility point of the first user ID is equal to or lower than the threshold value.

In an embodiment, there is provided a method for providing web pages to user terminals which access through user IDs. The method may include: storing objects associated with products on sale in a database; storing a plurality of message types having different graphic interfaces in the database, wherein each of the message types has a layout including one or more of the objects; providing the user terminals with web pages including at least some of the objects; scoring first convertibility points corresponding to the respective user IDs, according to whether actions of the user terminals on the web pages are matched with predetermined user events; storing or updating the first convertibility points in the database; selecting any one of the plurality of message types according to whether the first convertibility point of a first user ID among the user IDs is higher than a threshold value, when the first user ID accesses through a user terminal; including an object, selected among the objects, in the layout of the selected message type; and providing the selected message type including the selected object to the user terminal of the first user ID.

The selecting of any one of the plurality of message types may include: selecting a first message type among the plurality of message types, when the first convertibility point of the first user ID is higher than the threshold value; and selecting a second message type different from the first message type among the plurality of message types, when the first convertibility point of the first user ID is equal to or lower than the threshold value.

The method may further include: scoring second convertibility scores corresponding to the respective objects based on the actions of the user terminals; and storing or updating the second convertibility points into the database.

The including of the object, selected among the objects, in the layout of the selected message type may include: selecting candidate objects among the objects; listing the candidate objects according to the second convertibility points; and including at least some of the listed candidate objects as the selected object in the layout of the selected message type.

The including of the object, selected among the objects, in the layout of the selected message type may include: selecting at least one of the objects by referring to the second convertibility points; and including the selected object in the layout of the selected message type.

The method may further include: providing the plurality of message types to the user terminals, wherein the plurality of message types include at least some of the objects; and scoring third convertibility points corresponding to the respective message types by tracking actions of the user terminals, associated with the plurality of message types.

The selecting of any one of the plurality of message types may include selecting the message type having the highest third convertibility point, among the plurality of message types, when the first convertibility point of the first user ID is higher than the threshold value.

The selecting of any one of the plurality of message types may include selecting the message type having the highest third convertibility point, among the plurality of message types, when the first convertibility point of the first user ID is equal to or lower than the threshold value.

Some embodiments of the present disclosure may provide a mall server and method capable of improving an advertisement effect by providing adaptive recommendation messages to user terminals.

DETAILED DESCRIPTION

Hereafter, exemplary embodiments in accordance with the present disclosure will be described in detail with reference to the accompanying drawings. The following descriptions will be focused on only portions required for understanding operations in accordance with the present disclosure, and the descriptions of the other portions will be omitted in order not to unnecessarily obscure the subject matters of the present disclosure. However, the present disclosure is not limited to the embodiments described herein, but may be embodied in different manners. The embodiments described in this specification are only provided to describe the present disclosure in detail, such that the technical idea of the present disclosure can be easily carried out by those skilled in the art to which the present disclosure pertains.

Throughout the specification, when one element is referred to as being "connected" or "coupled" to another element, it may not only indicate that the former element is "directly connected" or "directly coupled" to the latter element, but also indicate that the former element is "indirectly connected" or "indirectly coupled" to the latter element with another element interposed therebetween. The terms used herein are provided to describe specific embodiments, and do not limit the present disclosure. In this specification, when an element "includes" or "comprises" a component, it may indicate that the element does not exclude another component unless referred to the contrary, but can further include or comprise another component. "At least any one of X, Y and Z" and "at least any one selected from a group consisting of X, Y and Z" may be construed as each of X, Y and Z or a combination of two or more of X, Y and Z (for example, XYZ, XYY, YZ and ZZ). Here, "and/or" includes one or more combinations of corresponding components.

Figure 1:
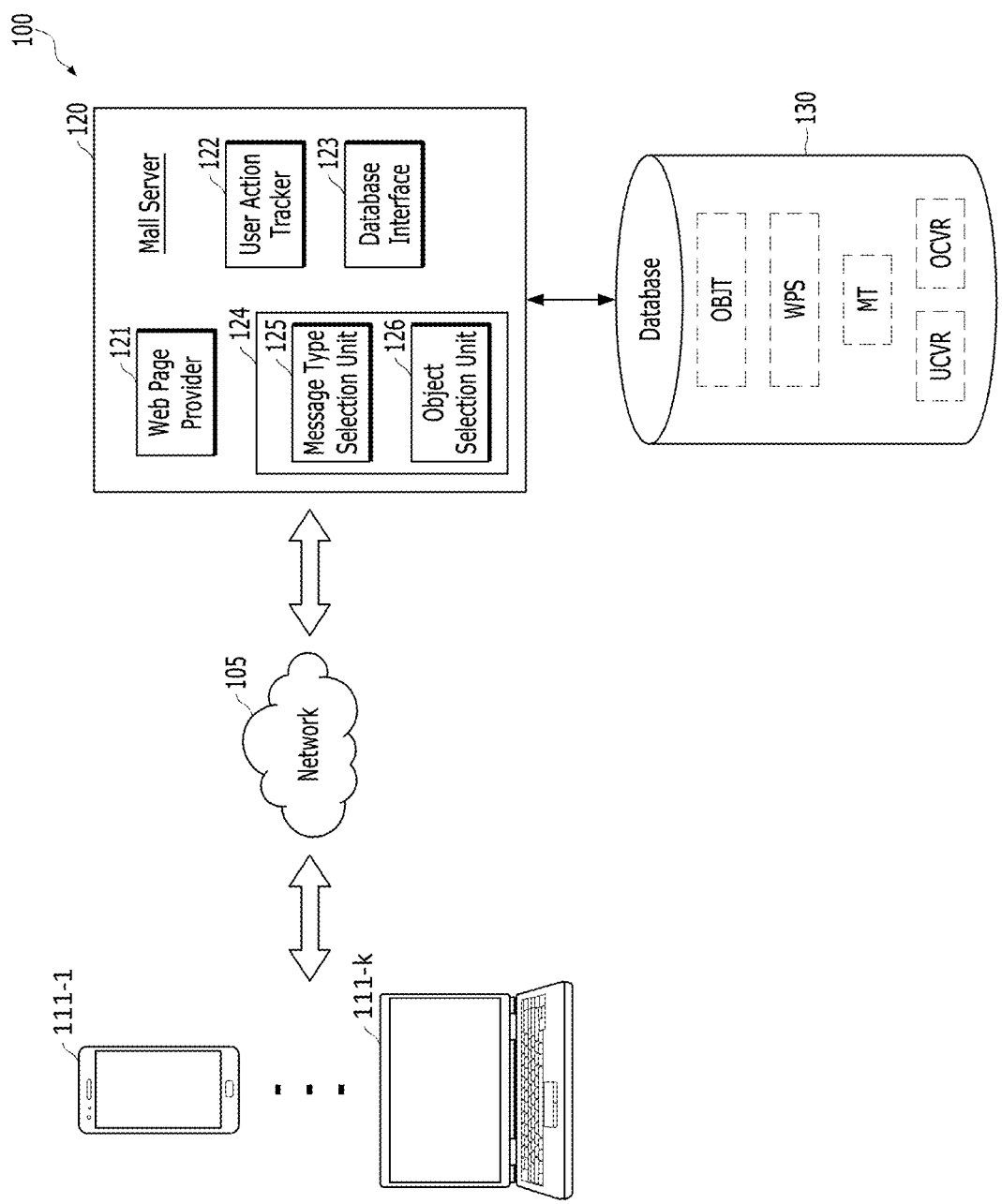
FIG. 1 is a block diagram illustrating a network system in accordance with an embodiment of the present disclosure.
Figure 2:
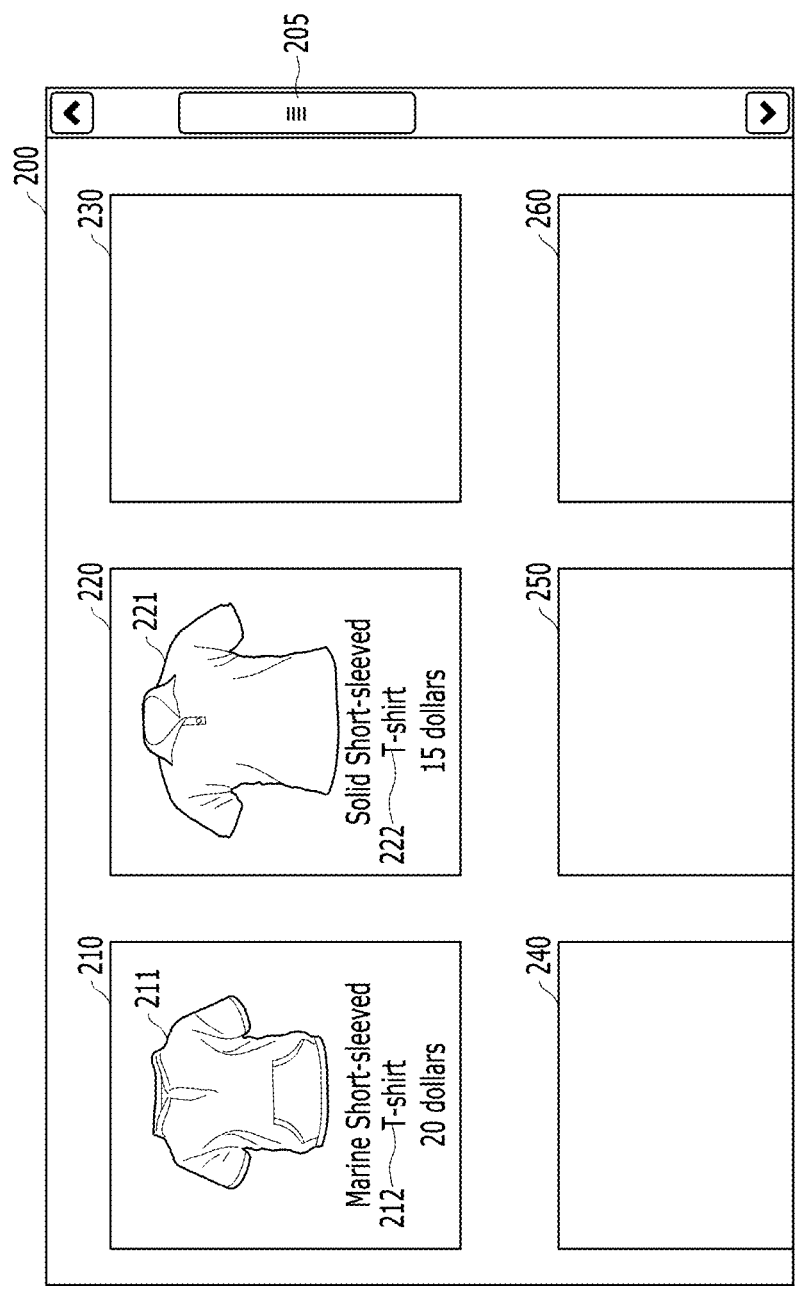
FIG. 2 is a diagram illustrating an example of a web page provided by a mall server of FIG. 1.
Figure 3:
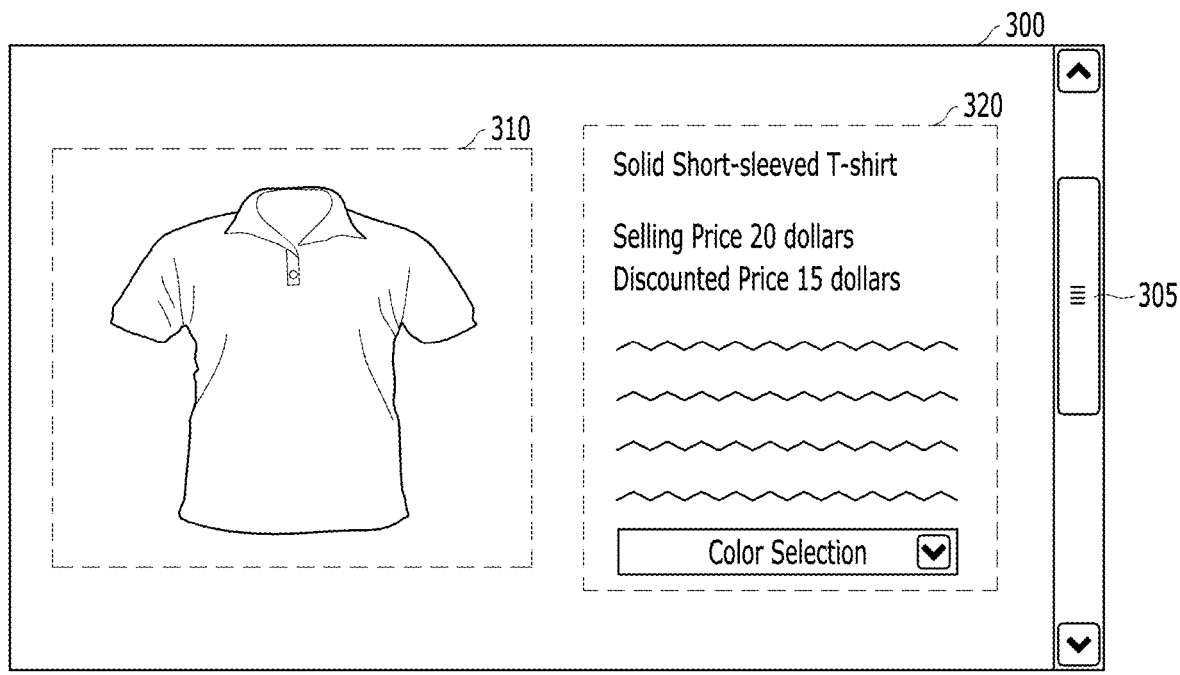
FIG. 3 is a diagram illustrating an example of a sub web page which is provided when one of objects of the web page of FIG. 2 is selected.
Figure 4:
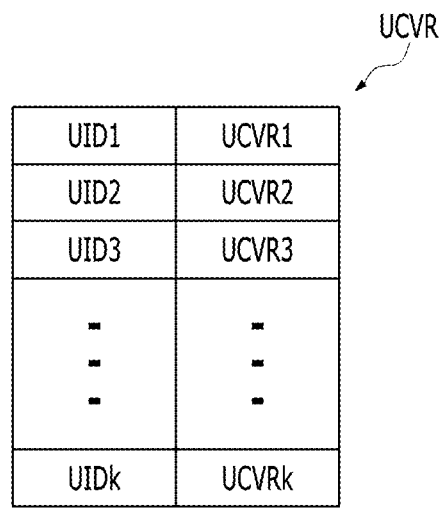
FIG. 4 is a table conceptually showing user convertibility points which are stored and updated in a database of FIG. 1.
Figure 5:
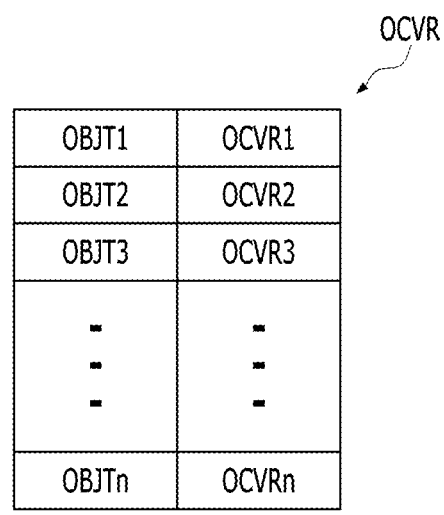
FIG. 5 is a table conceptually showing object convertibility points which are stored and updated in the database of FIG. 1.

FIG. 1 is a block diagram illustrating a network system in accordance with an embodiment of the present disclosure. FIG. 2 is a diagram illustrating an example of a web page provided by a mall server of FIG. 1. FIG. 3 is a diagram illustrating an example of a sub web page which is provided when any one of objects of the web page of FIG. 2 is selected. FIG. 4 is a table conceptually showing user convertibility points which are stored and updated in a database of FIG. 1. FIG. 5 is a table conceptually showing object convertibility points which are stored and updated in the database of FIG. 1.

Referring to FIG. 1, a network system 100 may include a network 105, first to $k^{th}$ user terminals 111-1 to 111-$k$, and a mall server 120.

The network system 100 may include a plurality of devices, servers and/or software components, which are operated to perform various methods in accordance with embodiments of the present disclosure. The devices and/or servers illustrated in FIG. 1 may be configured in different manners, and operations and services provided by the devices and/or servers may be coupled or decoupled for the embodiments described herein, and performed by a larger or smaller number of devices and/or servers. One or more devices and/or servers may be driven, operated and/or maintained by the same entity (e.g. same company) or different entities (e.g. different companies).

The network 105 connects components within the network system 100, such as the network 105, the first to kth user terminals 111-1 to 111-$k$, and the mall server 120. The network 105 may include one or more of a public network, one or more private networks, a wired network, a wireless network, another proper type of network, and combinations thereof. Each of the components within the network system 100 may have at least one of a wired communication function and a wireless communication function. Thus, the components of the network system 100 may communicate with each other through the network 105.

Each of the first to kth user terminals 111-1 to 111-$k$ may communicate with the mall server 120 through the network 105. Each of the user terminals 111-1 to 111-$k$ may include an application such as a web browser. The application may generate a user identification (user ID) through communication with the mall server 120, and then access the mall server 120 through the user ID in order to perform actions for a mall service. For example, the application of each of the user terminals 111-1 to 111-$k$ may receive user inputs through a user interface thereof, and access a web page provided by the mall server 120 and perform various actions or operations on the web page, in response to the received user inputs. In some embodiments, each of the user terminals 111-1 to 111-$k$ may perform various actions or operations of requesting and receiving various web pages, selecting an object on a web page, and scrolling a scroll bar on the web page. In certain embodiments, the application of each of the user terminals 111-1 to 111-$k$ may provide the mall server 120 with cookie information on the performed actions or operations.

In an embodiment, each of the user terminals 111-1 to 111-$k$ may include a device capable of transmitting/receiving information, data, and signals in a wired and/or wireless environment. Example of the device may include a computer, laptop, UMPC (Ultra Mobile PC), workstation, netbook, PDA (Personal Digital Assistant), portable computer, web tablet, wireless phone, mobile phone, smart phone, e-book, PMP (Portable Multimedia Player) and portable game machine.

The mall server 120 may be provided as a network server which communicates with the first to kth user terminals 111 to 11$k$ through the network 105, and provide web pages to the user terminals 111-1 to 111-$k$. The mall server 120 may track actions of each of the user terminals on the web pages, and transmit a recommendation message to recommend an object to the user terminal 111-1, . . . , 111-$k$.

A database 130 may store a plurality of objects OBJTs associated with or corresponding to products on sale. The object may indicate a data set including various pieces of information associated with a product on sale and/or a part of the data set. For example, each of the objects may include sub objects which may be a production description text including information such as the name, color, size and price of a product on sale, a photograph of the product, an image of the product, and an icon associated with the product. Among the data included in the objects stored in the database 130, data included in each of the web pages may be modified in various manners according to different embodiments.

The database 130 may store web page sources WPSs. The web page sources WPSs may include graphic interfaces such as layouts and icons of the respective web pages, and at least one of the objects OBJTs and/or a link thereof (for example, an address stored in the database 130).

The database 130 may further store plural types of messages MTs (hereafter, referred to as message types) including different graphic interfaces. Each of the message types MTs has layouts including at least one object. In accordance with an embodiment of the present disclosure, the mall server 120 may select a message type suitable for a user among the plurality of message types MTs, select at least one of the objects OBJTs, include the selected object OBJT in the selected message type MT, and provide the message type MT to the corresponding user terminal 111-1, . . . , 111-$k$. The selected message type MT may be provided while providing a web page to the user terminal 111-1, . . . , 111-$k$, and provided as a pop-up message to overlap the web page. In certain embodiments, the message types MTs may include different texts according to settings of a operator or manager of the mall server 120. For example, a first message type may include a text saying "Somebody just purchased this product", and a second message type may include a text saying "Are you looking for this product?".

The mall server 120 may include a web page provider 121, a user action tracker 122, a database interface 123 and a message type provider 124. One or more of the web page provider 121, the user action tracker 122, the database interface 123, the message type provider 124, a message type selection unit 125, and an object selection unit 126 may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The web page provider 121, the user action tracker 122, the database interface 123, the message type provider 124, the message type selection unit 125, and the object selection unit 126 (whether hardware, software, or a combination thereof) may be designed to implement or execute one or more particular functions or routines. For example, the web page provider 121, the user action tracker 122, the database interface 123, the message type provider 124, the message type selection unit 125, and the object selection unit 126 may be implemented as a processor.

The web page provider 121 may provide web pages in response to requests of the first to kth user terminals 111-1 to 111-$k$. When a specific web page is requested by the user terminal 111-1, . . . , 111-$k$, the web page provider 121 may retrieve from the database 130 and provide the corresponding web page source and/or an object included therein to the user terminal 111-1, . . . , 111-k. Thus, the user terminal 111-1, . . . , 111-k may display the web page such that the user can see the web page.

Referring to FIGS. 1 and 2, the web page provider 121 may provide the user terminal 111-1, . . . , 111-k with a web page 200 of FIG. 2 including a plurality of regions, for example, first to sixth regions 210 to 260, which displays some of the objects OBJTs. In response to a user input to scroll a scroll item 205, additional regions may be displayed within the web page 200.

Each of the first to sixth regions 210 to 260 may display different objects. In the first region 210, parts of a first object, such as a photograph 211 and a product description text 212 of a first product, may be displayed. In the second region 220, parts of a second object, such as a photograph 221 and a product description text 222 of a second product, may also be displayed. In each of the third to sixth regions 230 to 260, parts of third to sixth objects may also be displayed.

The user terminal 111-1, . . . , 111-k may transmit a request signal to the web page provider 121 of the mall server 120 in response to a user input to select one of the first to sixth regions 210 to 260 of the web page 200. The web page provider 121 of the mall server 120 may transmit the user terminal 111-1, . . . , 111-k with a sub web page corresponding to the selected region or linked by the selected region, in response to the request signal of the user terminal 111-1, . . . , 111-k. When the user terminal 111-1, . . . , 111-k transmits the request signal selecting the second region 220, the web page provider 121 of the mall server 120 may transmit the user terminal 111-1, . . . , 111-k with a sub web page 300 including additional or more parts of the second object as illustrated in FIG. 3. The sub web page 300 of FIG. 3 may include regions 310 and 320 including additional or more parts of the second object. When more data of the second object not displayed are included in the sub web page 300 in addition to the regions 310 and 320, the sub web page 300 may include a scroll item 305. Furthermore, the sub web page 300 may link another web page to provide a function of purchasing a product corresponding to the second object so that a user can purchase the product at another web page.

The web page 200 of FIG. 2 may be understood as a web page having a first depth or layer to display different objects in parallel, and the sub web page 300 of FIG. 3 may be understood as a web page having a second depth or layer to display an object selected among different objects.

Referring back to FIG. 1, the user action tracker 122 is configured to track actions of the first to kth user terminals 111-1 to 111-k on web pages, generate and update user convertibility points UCVRs and object convertibility points OCVRs, based on the tracked actions, and store the user convertibility points UCVRs and object convertibility points OCVRs in the database 130. The user convertibility points UCVRs may correspond to user IDs, respectively, and the object convertibility points OCVRs may correspond to the objects OBJT, respectively.

Referring to FIG. 4, the user convertibility points UCVRs may include first to kth user convertibility points UCVR1 to UCVRk corresponding to first to kth user IDs UID1 to UIDk, respectively. The first to kth user IDs UID1 to UIDk may be user IDs accessed through the first to kth user terminals 111-1 to 111-k (see FIG. 1). The user convertibility point UCVR may be understood as an index indicating the probability that a desired action, for example, a product purchase will be performed by the corresponding user ID. For example, the convertibility point UCVR may correspond to a conversion rate CVR.

The user action tracker 122 may be configured to track and count actions of the respective user terminals 111-1 to 111-k, and score the user convertibility points based on the actions of the respective user terminals 111-1 to 111-k. The user action tracker 122 may score a user convertibility point when an action of the user terminal is matched with, or corresponds to, any one of predetermined user events stored in the database 130 of the mall server 120. The predetermined user events may include preset events in which it is assumed that a user ID is highly likely to purchase a random product, and be changed according to the settings of the operator or manager of the mall server 120. In some embodiments, various events may be defined as the predetermined user events, the various events including, for example, but not limited to, a case in which a specific user ID stays on a sub web page (see FIG. 3) for a predetermined time or average time or more, a case in which a sub web page is scrolled over a predetermined depth (or ratio), a case in which a product is put in a shopping bag or basket, a list for saved for later or a list of favorite items, a case in which a product review is watched, and a case in which a web page for payment is accessed.

Referring to FIG. 5, the object convertibility points OCVRs may include first to $n^{th}$ object convertibility points OCVR1 to OCVRn corresponding to the first to $n^{th}$ objects OBJT1 to OBJTn, respectively. The first to $n^{th}$ objects OBJT1 to OBJTn may indicate the objects OBJTs (see FIG. 1) stored in the database 130. The object convertibility point may be understood as an index indicating the probability that a desired action, for example, a product purchase will be caused by the corresponding object.

The user action tracker 122 may be configured to track and count actions of the respective user terminals 111-1 to 111-k, and score the first to $n^{th}$ object convertibility points OCVR1 to OCVRn based on the actions of the first to kth user terminals 111-1 to 111-k. When any one of the predetermined object events occurs according to actions corresponding to the respective objects among the actions of the first to kth user terminals 111-1 to 111-k, the user action tracker 122 may score an object convertibility point. The predetermined object events may include events in which it is assumed that the corresponding product is highly likely to be purchased by a random user, and be changed according to the settings of the manager of the mall server 120. In certain embodiments, various elements may be defined as the object events, the various elements including the number of sales of a product corresponding to an object for a predetermined time, the ratio of a view count for an object for a predetermined time to the number of sales of a product, the price of a product, and a discount rate of a product.

Referring back to FIG. 1, the database interface 123 is configured to interface the components of the mall server 120 and the database 130. The web page provider 121, the user action tracker 122 and the message type provider 124 of the mall server 120 may access the database 130 through the database interface 123, and write and/or read data stored in the database 130. FIG. 1 illustrates that the database 130 is disposed or stored outside the mall server 120. In this case, the database interface 123 may communicate with the database 130 through the network 105. However, this is only an example, and at least a part of the database 130 may be provided or stored in the mall server 120.

The message type provider 124 may provide a message type selected among the message types MTs, when the web page provider 121 provides a web page to the user terminal 111-1, . . . , 111-*k*. The provided message type MT may be provided as a pop-up message to overlap the web page, and displayed on the user terminal 111-1, . . . , 111-*k*.

The message type provider 124 may include a message type selection unit 125 and an object selection unit 126. The message type selection unit 125 may refer to the user convertibility points UCVRs stored in the database 130. The message type selection unit 125 may select any one of the message types MTs according to whether the user convertibility point UCVR of a user ID to access the mall server 120 is higher than a threshold value. When the user convertibility point UCVR is higher than the threshold value, the message type selection unit 125 may select the first message type among the message types MTs. When the user convertibility point UCVR is equal to or lower than the threshold value, the message type selection unit 125 may select the second message type different from the first message type among the message types MTs. For example, the first message type may include a text saying "Somebody just purchased this product", and the second message type may include a text saying "Are you looking for this product?".

Users have different interests in the objects OBJTs. When the context of a message transferred to each of the users is adaptively changed according to the level of interest, it is possible to expect that the advertisement effect will be improved. In accordance with an embodiment of the present disclosure, the mall server 120 stores the plurality of message types MTs, selects any one of the message types MTs according to the user convertibility point of a user ID which accesses a web page, and provides the selected message type MT to the corresponding user terminal 111-1, . . . , 111-*k*. Thus, the mall server 120 may provide an adaptive message type to the user, and the advertisement effect may be improved.

The object selection unit 126 may refer to the object convertibility points OCVRs stored in the database 130. The object selection unit 126 may select at least one of the objects OBJTs based on the object convertibility points OCVRs, and include the selected object in the layout of the message type MT selected by the message type selection unit 125.

The object convertibility points OCVRs of FIG. 4 corresponding to the first to kth user IDs UID1 to UIDk and object convertibility points OCVRs of FIG. 5 corresponding to the first to n$^{th}$ objects OBJT1 to OBJTn for the database 130 may improve in an existing technology by providing increased flexibility, faster search times, and smaller memory requirements.

Figure 6A:
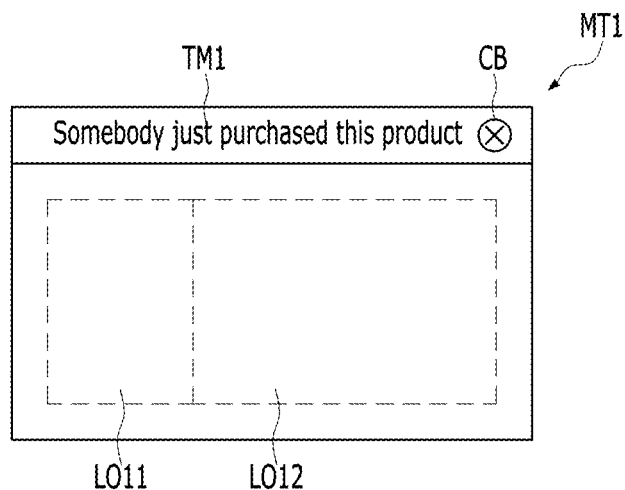
FIGS. 6A and 6B are diagrams illustrating screens on which examples of message types stored in the database of FIG. 1 are displayed.
Figure 6B:
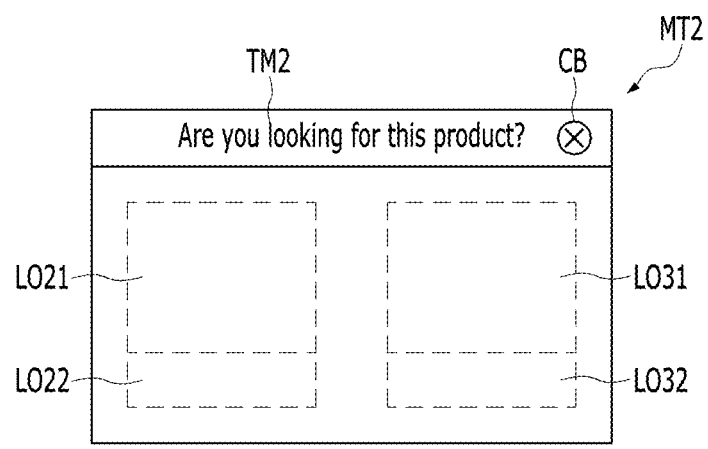

FIGS. 6A and 6B are diagrams illustrating examples of screens on which embodiments of message types stored in the database of FIG. 1 are displayed.

Referring to FIG. 6A, the first message type MT1 may include a first text TM1 and layouts LO11 and LO12. The first text TM1 may include a text message saying "Somebody just purchased this product.". Each of the layouts LO11 and LO12 may include an object. For example, the layout LO11 may include a product photograph among objects of a product, and the layout LO12 may include a part of a product description text among the objects of the same product. The first message type MT1 may further include a cancellation button CB for closing the first message type MT1. The message type selection unit 125 of FIG. 1 may select the first message type MT1 when the user convertibility point of a user ID having accessed the mall server 120 is higher than the threshold value.

Referring to FIG. 6B, the second message type MT2 may include a graphic interface different from the first message type MT1. The second message type MT2 may include a second text TM2 and layouts LO21, LO22, LO31 and LO32. The second text TM2 may include a text message saying "Are you looking for this product?".

Each of the layouts LO21 and LO22 may include an object. The layout LO21 may include a product photograph among objects of a product, and the layout LO22 may include a part of a product description text among the objects of the product. Each of the layouts LO31 and LO32 may include another object. The layout LO31 may include a product photograph of another product, and the layout LO32 may include a part of a product description text of the another product. The message type selection unit 125 of FIG. 1 may select the second message type MT2 when the user convertibility point of the user ID having accessed the mall server 120 is equal to or lower than the threshold value.

The user convertibility point may be understood as an index which indicates the probability that the corresponding user ID will take a desired action (for example, product purchase), as described above. The mall server 120 may provide a user, who is highly likely to purchase a product, with the first message type MT1 including information which may make the user decide to purchase a product, and provide a user, who is unlikely to purchase a product, with the second message type MT2 including information for raising the levels of interest in products, thereby improving the advertisement effect.

Figure 7:
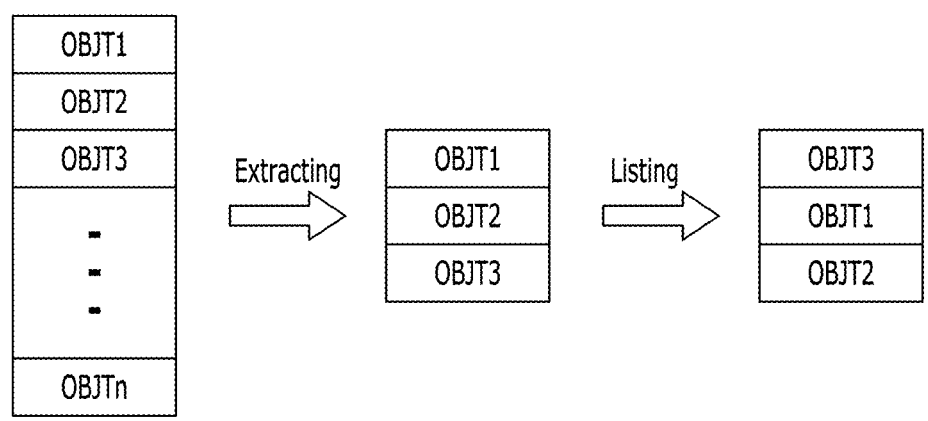
FIG. 7 is a diagram for describing a process of selecting objects stored in the database of FIG. 1.

FIG. 7 is a diagram for describing a process of selecting objects stored in the database of FIG. 1.

Referring to FIGS. 1 and 7, the object selection unit 126 of the mall server 120 may extract some objects (e.g. a certain number or a predetermined number of objects) among the first to n$^{th}$ objects OBJT1 to OBJTn stored in the database 130, using various algorithms or methods. In the embodiment of FIG. 7, OBJT1, OBJT2 and OBJT 3 are extracted by the object selection unit 126. For example, the object selection unit 126 may patternize actions of the user IDs according to various elements such as an object selected next time by a user having selected a specific object and an object purchased with a specific object at a high ratio, and extract the first to third objects OBJT1 to OBJT3 through various types of personalized recommendation algorithms which are known to the field in order to analyze the association between an object and a user ID and the association between an object and an object.

The object selection unit 126 may list the order of the objects OBJT1 to OBJT3 based on the object convertibility points OCVRs stored in the database 130. For example, when the third object OBJT3 of the first to third objects OBJT1 to OBJT3 has the highest object convertibility point and the second object OBJT2 of the first to third OBJT1 to OBJT3 has the lowest object convertibility point, the object selection unit 126 may sequentially sort the third object OBJT3, the first object OBJT1 and the second object OBJT2 as illustrated in FIG. 7.

The object selection unit 126 may include the sorted objects in the layouts of the selected message type. For example, when the selected message type has layouts which may include three or more objects, the object selection unit 126 may sequentially include the third object OBJT3, the first object OBJT1 and the second object OBJT2 in the selected message type.

The object convertibility point may be understood as an index indicating the probability that a desired action, for example, a product purchase will be caused by the corresponding object, as described above. The mall server 120 may include the objects, which are listed in the order in which the objects are highly likely to cause purchase, in the selected message type, thereby further improving the advertisement effect.

Figure 8:
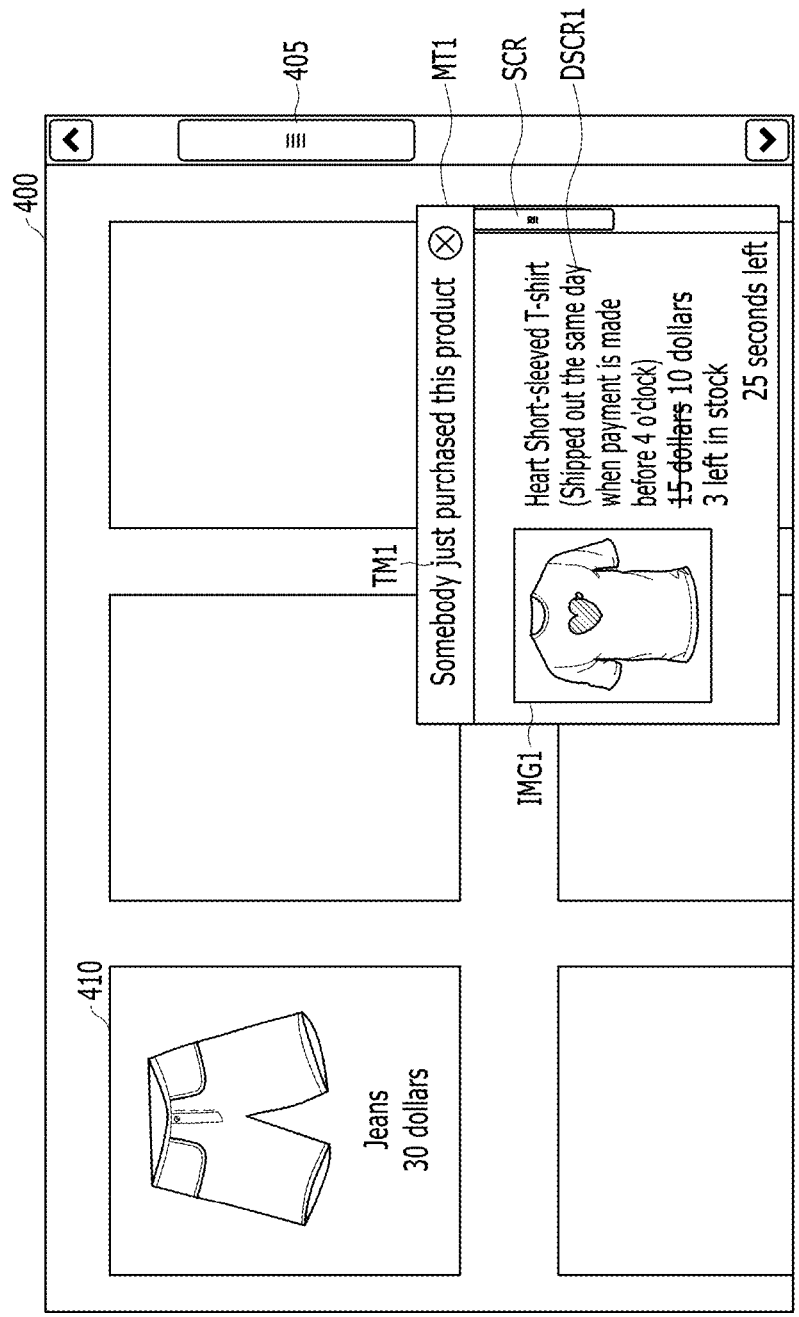
FIGS. 8 and 9 are diagrams illustrating examples of web pages and message types which are provided by the mall server of FIG. 1.
Figure 9:
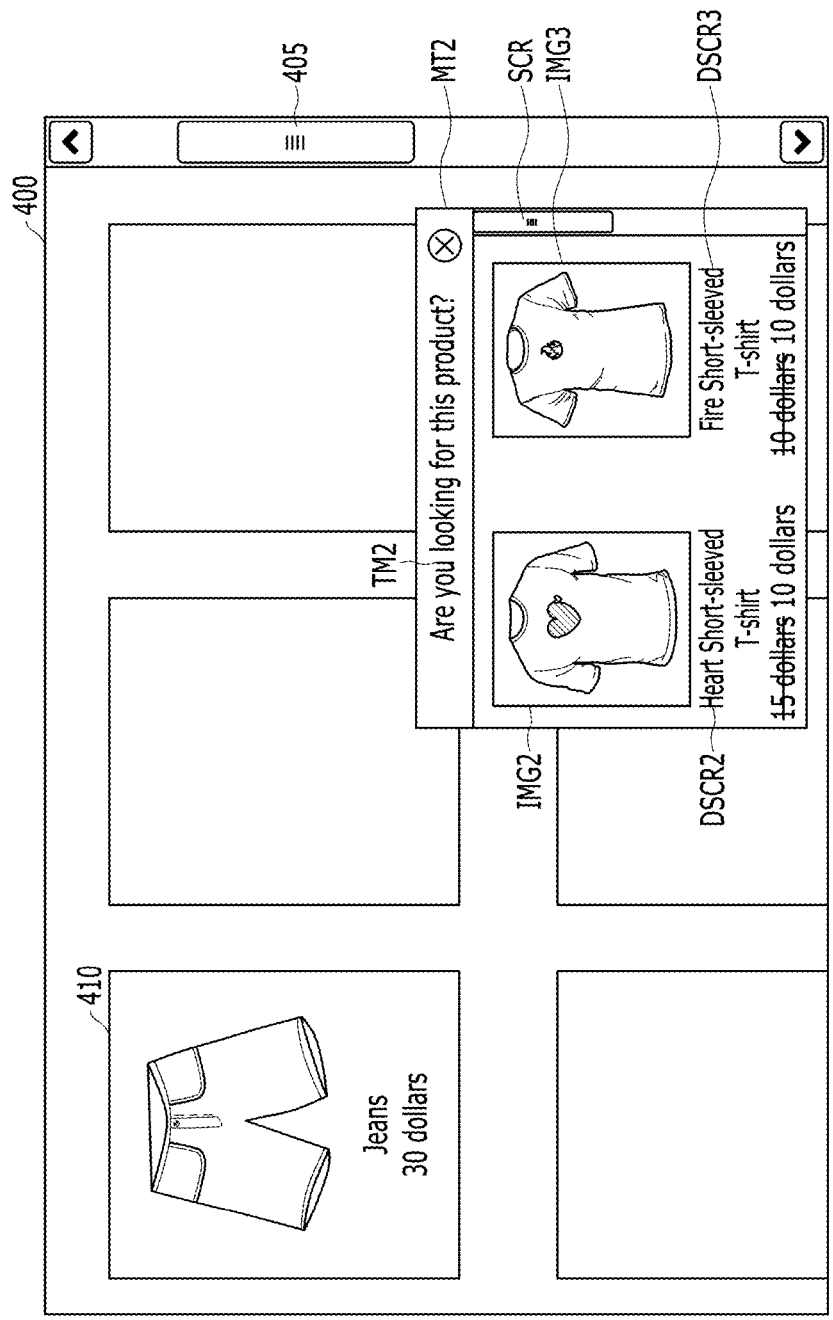

FIGS. 8 and 9 are diagrams illustrating examples of web pages and message types which are provided by the mall server of FIG. 1.

Referring to FIGS. 1 and 8, the web page provider 121 of the mall server 120 may provide the user terminal 111-1, . . . , 111-$k$ with a web page 400 including a plurality of regions 410 which display some of the objects OBJTs. The message type selection unit 125 may select the first message type MT1 from a plurality of message types MTs stored in the database 130 when the user convertibility point of a user ID having accessed the mall server 120 is higher than the threshold value. The object selection unit 126 may select one or more objects as described above. Therefore, an image IMG1 and a product description text DSCR1 of the selected object may be included in the layouts LO11 and LO12 (see FIG. 6A) of the first message type MT1. The first message type MT1 may include information which may make the user decide to purchase a product, for example, a text saying "Somebody just purchased this product.", the discount rate and the status of stock availability of the product and the like.

Referring to FIGS. 1 and 9, the message type selection unit 125 of the mall server 120 may select the second message type MT2 when the user convertibility point of the user ID having accessed the mall server 120 is equal to or lower than the threshold value. One or more objects may be selected by the object selection unit 126. An image IMG2 and a product description text DSCR2 of a selected object and an image IMG3 and a product description text DSCR3 of another selected object may be included in the layouts LO21, LO22, LO31 and LO32 (see FIG. 6B) of the second message type MT2. The second message type MT2 includes a graphic interface different from the first message type MT1. The second message type MT2 may include more objects in the same area using a scroll item SCR. The second message type MT2 may include various pieces of information for increasing or raising the levels of interest in products, for example, a text saying "Are you looking for this product?", the discount rate of the product and the like.

Figure 10:
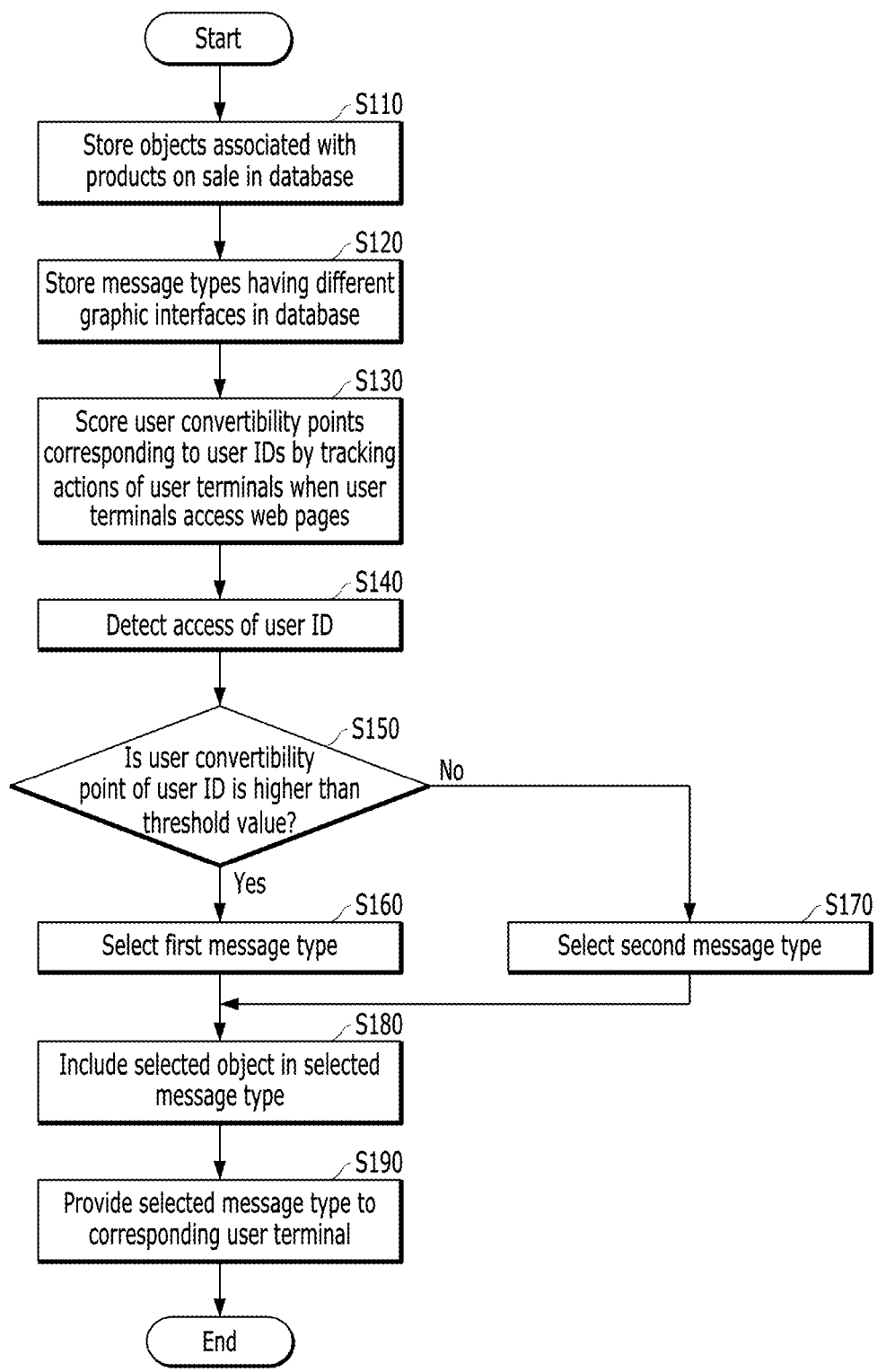
FIG. 10 is a flowchart illustrating a method of operating a mall server in accordance with an embodiment of the present disclosure.

FIG. 10 is a flowchart illustrating a method of operating the mall server in accordance with an embodiment of the present disclosure.

Referring to FIGS. 1 and 10, the mall server 120 stores the objects OBJTs associated with products on sale in the database 130 in step S110. In step S120, the mall server 120 stores a plurality of message types MTs having different graphic interfaces in the database 130.

In step S130, the mall server 120 provides one or more web pages to the first to kth user terminals 111-1 to 111-$k$. The mall server 120 tracks actions, operations and/or inputs of the first to kth user terminals 111-1 to 111-$k$, and scores the user convertibility points UCVRs corresponding to user IDs, respectively. The scored user convertibility points UCVRs are updated into the database 130.

In step S140, the mall server 120 detects an access of a specific user ID through a user terminal. For example, the mall server 120 identifies a user ID of a user terminal 111-1, . . . , 111-$k$ which accesses one or more web pages of the mall server 120. The corresponding user terminal 111-1, . . . , 111-$k$ will access a random web page of the mall server 120. In step S150, the mall server 120 determines whether the user convertibility point of the user ID is higher than the threshold value. When the user convertibility point of the user ID is higher than the threshold value, step S160 is performed. Otherwise, step S170 is performed.

In step S160, the mall server 120 selects the first message type among the plurality of the message types MTs. In step S170, the mall server 120 selects the second message type among the plurality of the message types MTs.

In step S180, the mall server 120 includes one or more of the objects OBJTs in the selected message type, or adds one or more of the objects OBJTs to the selected message type. In step S190, the mall server 120 provides the selected message type including one or more of the objects OBJTs to the corresponding user terminal 111-1, . . . , 111-$k$. The selected message type may be provided as, for example, but not limited to, a pop-up message to overlap the web page (see FIGS. 8 and 9).

The mall server 120 may provide different message types according to the user convertibility points, thereby improving the advertisement effect and effectively providing messages associated with a product to a user terminal.

Figure 11:
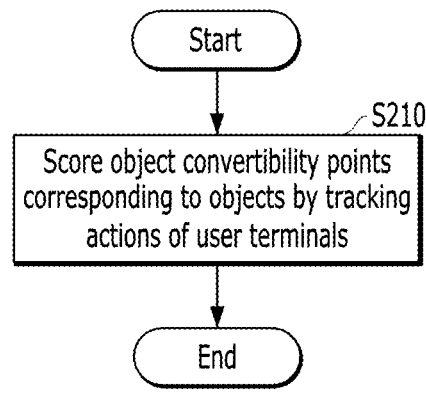
FIG. 11 is a flowchart illustrating an embodiment of a method of operating a mall server, which is performed to acquire an object convertibility point.

FIG. 11 is a flowchart illustrating an embodiment of a method of operating the mall server, which is performed to acquire an object convertibility point.

Referring to FIGS. 1 and 11, the mall server 120 may track actions of the first to kth user terminals 111-1 to 111-$k$, and score the object convertibility points OCVRs corresponding to the objects OBJTs, respectively. The scored object convertibility points OCVRs are stored and updated into the database 130. In certain embodiments, step S210 may be performed at the same time as step S130.

Figure 12:
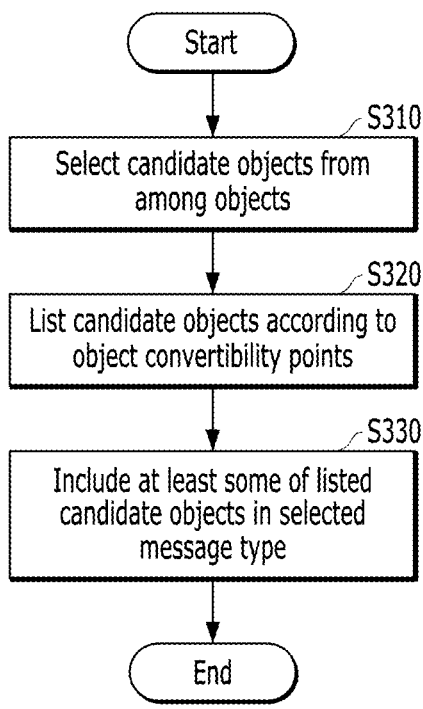
FIG. 12 is a flowchart illustrating a method for selecting an object which is to be included in a message type according to an embodiment of the present disclosure.

FIG. 12 is a flowchart illustrating an embodiment of a method for selecting an object which is to be included in a message type.

Referring to FIGS. 1 and 12, the mall server 120 selects a candidate object among the objects OBJTs in step S310. The mall server 120 may patternize actions of the user IDs according to various elements such as an object selected next time by a user having selected a specific object and an object purchased with a specific object at a high ratio, and use various types of personalized recommendation algorithms which are known to this field in order to analyze the association between an object and a user ID and the association between one object and another object, in order to select candidate objects from the objects OBJTs.

In step S320, the mall server 120 lists the candidate objects in descending order of the object convertibility points OCVRs.

In step S330, the mall server 120 may include at least some of the candidate objects, which are sorted in descending order of the object convertibility points OCVRs, in the selected message type. For example, steps S310 to S330 may be included in or performed with step S180 of FIG. 10. The mall server 120 may include the objects, which are listed in descending order of the object convertibility points, in the selected message type, or add the objects to the selected message type, thereby further improving the advertisement effect and the processing speed performance and the performance of efficiency of the mall server 120.

Figure 13:
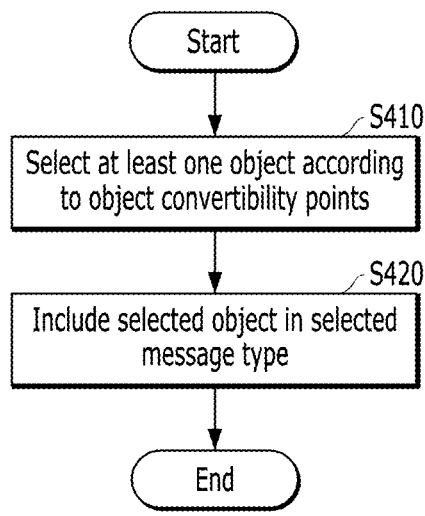
FIG. 13 is a flowchart illustrating a method for selecting an object which is to be included in a message type according to another embodiment of the present disclosure.

FIG. 13 is a flowchart illustrating another embodiment of a method for selecting an object which is to be included in a message type.

Referring to FIGS. 1 and 13, the mall server 120 selects one or more objects among the objects OBJTs according to the object convertibility points OCVRs in step S410. For instance, one object having the highest convertibility point or objects having high object convertibility points may be selected. In certain embodiments, the predetermined number of objects is selected. Thus, it is possible to expect that the advertisement effect will be improved.

In step S420, the mall server 120 includes the selected object(s) in a selected message type, or adds the selected object(s) to the selected message type. For example, steps S410 and S420 may be included in or performed with step S180 of FIG. 10.

Figure 14:
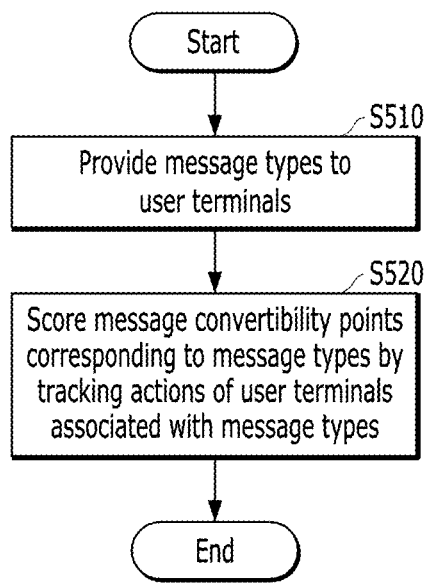
FIG. 14 is a flowchart illustrating an embodiment of a method of operating a mall server, which is performed to acquire a message convertibility point.

FIG. 14 is a flowchart illustrating an embodiment of a method of operating a mall server, which is performed to acquire a message convertibility point.

Referring to FIGS. 1 and 14, the message type provider 124 of the mall server 120 provides a plurality of message types MTs to the first to kth user terminals 111-1 to 111-k in step S510. Initially, the mall server 120 may provide a random message type when providing a web page to a user terminal. The provided message type may include one or more objects.

In step S520, the user action tracker 122 of the mall server 120 scores message convertibility points corresponding to the plurality of message types MTs, respectively, by tracking actions of the user terminals 111-1 to 111-k, associated with the message types MTs. The scored message convertibility points are stored in the database 130.

Figures 15, 16:
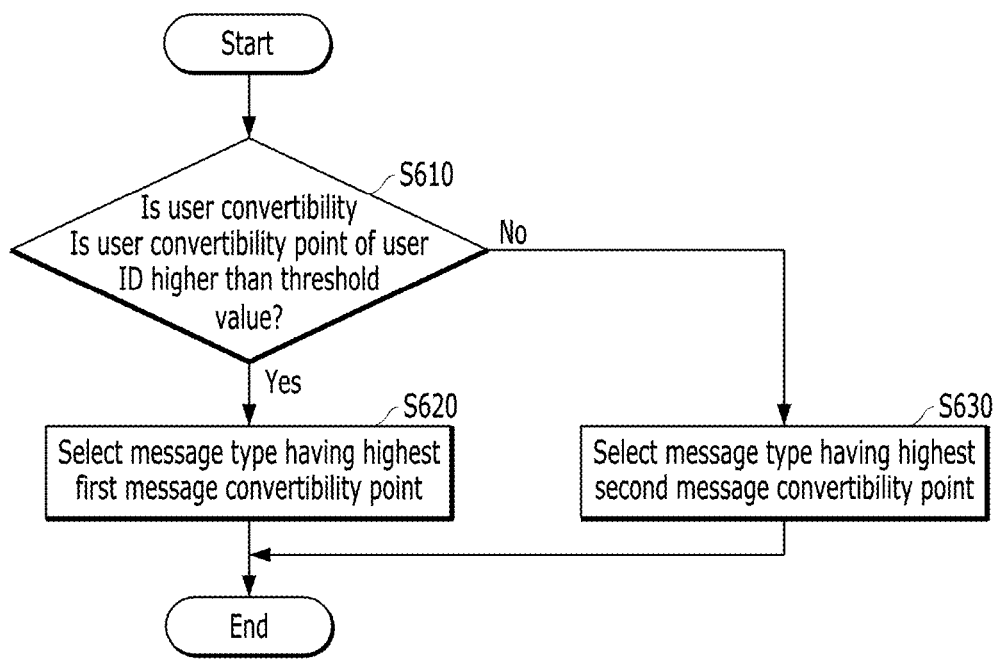
FIG. 15 is a table conceptually illustrating message convertibility points which are scored in relation to the respective message types.
FIG. 16 is a flowchart illustrating an embodiment of a method for selecting a message type by referring to message convertibility points.

FIG. 15 is a table conceptually illustrating message convertibility points which are scored in relation to the respective message types.

Referring to FIG. 15, one or more message convertibility points corresponding to each of the message types may be scored. In the embodiment illustrated in FIG. 15, when first to third message types MT1 to MT3 are provided, first message convertibility points MCVR11 to MCVR13 and second message convertibility points MCVR21 to MCVR23 corresponding to each of the first to third message types MT1 to MT3 may be generated and stored in the database 130.

First message convertibility points MCVR11 to MCVR13 corresponding to the first to third message types MT1 to MT3, respectively, may be scored. The first message convertibility point may be understood as an index indicating the probability that a desired first action, for example, a product purchase will be caused by the corresponding message type. In certain embodiments, the first message convertibility points MCVR11 to MCVR13 may be scored according to whether the actions of the user terminals 111-1 to 111-k, associated with the respective message types, are matched with predetermined first events. The first events may be events in which it is assumed that a product purchase has been caused by the corresponding message type. For example, various elements may be defined as the first events, the various elements including the number of sales caused by a message type, and the ratio of the number of times that an object included in the message type is selected to the number of sales caused by the message type. The first events may be changed in various manners according to settings of the operator or manager of the mall server 120.

Furthermore, second message convertibility points MCVR21 to MCVR23 corresponding to the first to third message types MT1 to MT3, respectively, may be scored. The second message convertibility point may be understood as an index indicating the probability that a second action, for example, a selection (e.g. touch or click) of an object included in the corresponding message type will be caused by the message type. For example, the second message convertibility point may be understood as an index indicating how much the corresponding message type draws a user's interest. In some embodiments, the second message convertibility points MCVR21 to MCVR23 may be scored according to whether the actions of the user terminals 111-1 to 111-k, associated with the respective message types are, are matched with predetermined second events. The second events may be events in which it is assumed that the corresponding message type has drawn a user's interest. For example, various elements may be defined as the second events, the various elements including the number of times that an object included in the message type is selected, and the time during which a user ID stays on a web page provided according to the selection. The second events may be changed in various manners according to settings of the operator or manager of the mall server 120.

FIG. 16 is a flowchart illustrating an embodiment of a method for selecting a message type by referring to message convertibility points.

Referring to FIGS. 1 and 16, the mall server 120 determines whether the user convertibility point of a user ID is higher than a threshold value (e.g. a preset value), in step S610. When the user convertibility point of the user ID is higher than the threshold value, step S620 is performed. Otherwise, step S630 is performed.

In step S620, the mall server 120 selects the message type having the highest first message convertibility point (see MCVR11 to MCVR13 of FIG. 15) among the message types (see MT1 to MT3 of FIG. 15). Thus, a message type which has a high first message convertibility point, i.e. a message type which is highly likely to cause a user ID to purchase a product, may be provided to a user ID which has a user convertibility point higher than the threshold value, i.e. a user ID which is highly likely to purchase the product. Therefore, it is possible to efficiently induce the user ID to purchase the product.

In step S630, the mall server 120 selects a message type having the highest second message convertibility point (see MCVR21 to MCVR23 of FIG. 15) among the message types (see MT1 to MT3 of FIG. 15). Thus, a message type which has a high second message convertibility point, i.e. a message type which is highly likely to cause a user ID to select an object included in the corresponding message type, may be provided to a user ID which has a user convertibility point lower than the threshold value, i.e. a user ID which is unlikely to purchase the product. Therefore, it is possible to efficiently increase or raise the level of interest in the product. As such, an adaptive message type may be provided to a user, which makes it possible to expect that the advertisement effect will be improved.

Figure 17:
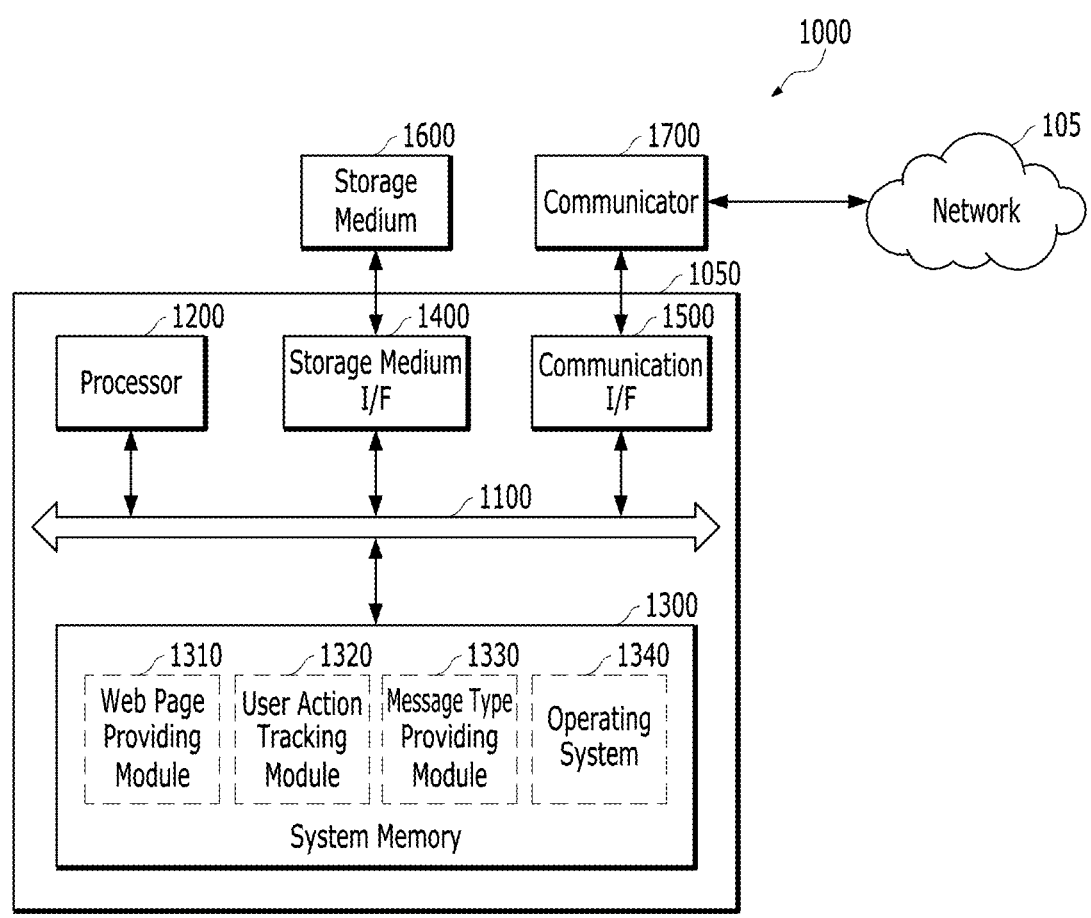
FIG. 17 is a block diagram illustrating an embodiment of a computer device suitable for implementing the mall server of FIG. 1.

FIG. 17 is a block diagram illustrating an embodiment of a computer device suitable for implementing the mall server of FIG. 1.

Referring to FIG. 17, a computer device 1000 may include a bus 1100, one or more processors 1200, a system memory 1300, a storage medium interface (I/F) 1400, a communication I/F 1500, a storage medium 1600 and a communicator 1700.

The bus 1100 is connected to various components of the computer device 1000, and transfers data, signals and information from one component to another component. The processor 1200 may be any one of a general processor and a dedicated processor, and control overall operations of the computer device 1000.

The processor 1200 is configured to load program codes and commands, which are executed to provide various functions, to the system memory 1300, and process the loaded program codes and commands. The system memory 1300 may be provided as a working memory of the processor 1200. In an embodiment, the system memory 1300 may include one or more of a RAM (Random Access Memory), a ROM (Read Only Memory) and a medium which can be read by another type of computer.

The processor 1200 may load a web page providing module 1310, a user action tracking module 1320 and a message type providing module 1330 to the system memory 1300. The web page providing module 1310 provides the functions of the web page provider 121 of FIG. 1 when executed by the processor 1200, the user action tracking module 1320 provides the functions of the user action tracker 122 of FIG. 1 when executed by the processor 1200, and the message type providing module 1330 provides the functions of the message type provider 124 of FIG. 1 when executed by the processor 1200. The processor 1200 may load an operating system 1340 to the system memory 1300, and execute the loaded operating system 1340 to control overall operations of the computer device 1000. The operating system 1340 executed by the processor 1200 may provide the web page providing module 1310, the user action tracking module 1320 and the message type providing module 1330 with interfaces for the components of the computer device 1000, such as the system memory 1300, the storage medium I/F 1400 and the communication I/F 1500. The operating system 1340 executed by the processor 1200 may provide the functions of the database I/F 123 of FIG. 1. As such, the web page providing module 1310, the user action tracking module 1320, the message type providing module 1330 and the operating system 1340, which are loaded to the system memory 1300, may be executed by the processor 1200, and perform the functions or operations of the mall server 120, described with reference to FIG. 1, and the operations described with reference to FIGS. 10 to 14 and 16.

The program codes and/or commands may be loaded to the system memory 1300 from the storage medium 1600 as a recording medium which can be read by a separate computer. Alternatively, the program codes and/or commands may be loaded from the outside of the computer device 1000 to the system memory 1300 through the communicator 1700.

In addition, the system memory 1300 may function as a buffer memory for the web page providing module 1310, the user action tracking module 1320, the message type providing module 1330 and the operating system 1340. The plurality of objects OBJTs, the web page sources WPS, the message types MTs, and the convertibility points UCVRs, OCVRs and MCVRs may be partially loaded to the system memory 1300.

FIG. 17 illustrates the system memory 1300 as a component separate from the processor 1200, but at least a part of the system memory 1300 may be included in the processor 1200. According to some embodiments, the system memory 1300 may be provided as a plurality of memories which are physically and/or logically separated from each other.

The storage medium I/F 1400 is connected to the storage medium 1600. The storage medium I/F 1400 may interface the storage medium 1600 and the components connected to the bus 1100, such as the processor 1200 and the system memory 1300. The communication I/F 1500 is connected to the communicator 1700. The communication I/F 1500 may interface the communicator 1700 and the components connected to the bus 1100.

In certain embodiments, the bus 1100, the processor 1200 and the system memory 1300 may be integrated on one board 1050. For example, the bus 1100, the processor 1200 and the system memory 1300 may be mounted on one semiconductor chip. In some embodiments, the board 1050 may further include the storage medium I/F 1400 and the communication I/F 1500.

The storage medium 1600 may include various types of nonvolatile storage media which retain data stored therein even though power is cut off. For example, the storage medium 1600 may include a flash memory, a hard disk and the like. The storage medium 1600 may be provided as at least a part of the database 130 of FIG. 1. The storage medium 1600 may store the plurality of objects OBJTs, the web page sources WPS, the message types MTs and the convertibility points UCVRs, OCVRs and MCVRs of FIG. 1.

The communicator 1700 (or transceiver) may transmit/receive signals between the computer device 1000 and other or external devices and/or servers within the network system 100 (see FIG. 1) through the network 105.

While various embodiments have been described above, it will be understood to those skilled in the art that the embodiments described are by way of example only. Accordingly, the disclosure described herein should not be limited based on the described embodiments.

What is claimed is:

1. A network server for providing web pages to user terminals which access through user identifications (user IDs), the network server comprising:
   a communicator connected to a network; and
   a processor configured to communicate with the user terminals through the communicator,
   wherein the processor is configured to:
   store objects associated with products on sale in a database;
   store a plurality of message types having different graphic interfaces in the database, wherein each of the message types has a layout including one or more of the objects associated with the products on sale, and the plurality of message types include one group of first message types, and another group of second message types different from the one group of the first message types;
   provide the user terminals with the web pages including at least one of the objects associated with the products on sale;
   score first convertibility points corresponding to the plurality of message types, respectively, by tracking actions of the user terminals on the provided web pages;
   score second convertibility points corresponding to the user IDs, respectively, according to the actions of the user terminals on the web pages, wherein the second convertibility points indicate indexes correlating the actions of the user terminals to a predetermined user event associated with the product on sale;
   score third convertibility points corresponding to the objects, respectively, according to the actions of the user terminals, wherein the third convertibility points indicate indexes correlating the actions of the user terminals to the objects;
   select one or more candidate objects among the objects according to the third convertibility points corresponding to the objects;
   store or update the first convertibility points corresponding to the message types, the second convertibility points corresponding to the user IDs, and the third convertibility points corresponding to the objects in the database;
   when one of the user terminals accesses through one of the user IDs to the network server, determine whether a second convertibility point corresponding to the one of the user IDs accessing to the network server is higher than a threshold value, select one from the one group of the first message types based on the first convertibility points corresponding to the plurality of message types and include the candidate objects selected based on the third convertibility points corresponding to the objects in a layout of the one selected from the one group of the first message types based on the first convertibility points corresponding to the plurality of message types if the second convertibility point corresponding to the one of the user IDs accessing to the network server is higher than the threshold value, and select one from the another group of the second message types different from the one group of the first message types based on the first convertibility points corresponding to the plurality of message types and include the candidate objects selected based on the third convertibility points corresponding to the objects in a layout of the one selected from the another group of the first message types based on the first convertibility points corresponding to the plurality of message types if the second convertibility point corresponding to the one of the user IDs accessing to the network server is equal to or lower than the threshold value; and provide the selected one of the message types having the layout including the one or more objects to the one of the user terminals which accesses through the one of the user IDs to the network server.

2. The network server of claim 1, wherein the processor is configured to:
score the second convertibility points corresponding to the user IDs, respectively, according to comparison between the actions of the user terminals on the web pages and the predetermined user event stored in the database, and
select the one of the plurality of message types for the one of the user IDs according to comparison between a predetermined threshold value and the one of the second convertibility points corresponding to the one of the user IDs.

3. The network server of claim 1, wherein the plurality of message types comprise different texts.

4. The network server of claim 1, wherein the first convertibility points indicate indexes correlating the actions of the user terminals to the plurality of message types.

5. The network server of claim 1, wherein the processor is configured to select one of the message types having a highest first convertibility point among the one group of the first message types as the one of the plurality of message types, when the second convertibility point of the one of the user IDs is higher than the threshold value.

6. The network server of claim 1, wherein the processor is configured to select one of the message types having a highest first convertibility point among the another group of the second message types as the one of the plurality of message types, when the second convertibility point of the one of the user IDs is equal to or lower than the threshold value.

7. The network server of claim 1, wherein the processor is configured to:
score convertibility points of a first type corresponding to the plurality of message types, respectively, according to whether the actions of the user terminals on the web pages are matched with first events;
score convertibility points of a second type corresponding to the plurality of message types, respectively, according to whether the actions of the user terminals on the web pages are matched with second events, wherein the first convertibility points comprise the convertibility points of the first type and the convertibility points of the second type;
select one from the one group of the first message types based on the convertibility points of the first type corresponding to the plurality of message types if the second convertibility point corresponding to the one of the user IDs accessing to the network server is higher than the threshold value; and
select one from the another group of the second message types based on the convertibility points of the second type corresponding to the plurality of message types if the second convertibility point corresponding to the one of the user IDs accessing to the network server is equal to or lower than the threshold value.

8. A method for providing web pages to user terminals which access through user identifications (user IDs) to a network server, the method comprising:
storing objects associated with products on sale in a database;
storing a plurality of message types having different graphic interfaces in the database, wherein each of the message types has a layout including one or more of the objects associated with products on sale, and the plurality of message types include one group of first message types, and another group of second message types different from the one group of the first message types;
providing the user terminals with the web pages including at least one of the objects associated with products on sale;
scoring first convertibility points corresponding to the plurality of message types, respectively, by tracking actions of the user terminals on the provided web pages;
scoring second convertibility points corresponding to the user IDs, respectively, according to the actions of the user terminals on the web pages, wherein the second convertibility points indicate indexes correlating the actions of the user terminals to a predetermined user event associated with the product on sale;
scoring third convertibility points corresponding to the objects, respectively, according to the actions of the user terminals, wherein the third convertibility points indicate indexes correlating the actions of the user terminals to the objects;
selecting one or more candidate objects among the objects according to the third convertibility points corresponding to the objects;
storing or updating the first convertibility points corresponding to the message types, the second convertibility points corresponding to the user IDs, and the third convertibility points corresponding to the objects in the database;
when one of the user terminals accesses through one of the user IDs to the network server, determining whether a second convertibility point corresponding to the one of the user IDs accessing to the network server is higher than a threshold value, selecting one from the one group of the first message types based on the first convertibility points corresponding to the plurality of message types and including the candidate objects selected based on the third convertibility points corresponding to the objects in a layout of the one selected from the one group of the first message types based on the first convertibility points corresponding to the plurality of message types if the second convertibility point corresponding to the one of the user IDs accessing to the network server is higher than the threshold value, and selecting one from the another group of the second message types different from the one group of the first message types based on the first convertibility points corresponding to the plurality of message types and including the candidate objects selected based on the third convertibility points corresponding to the objects in a layout of the one selected from the another group of the first message types based on the first convertibility points corresponding to the plurality of message types if the second convertibility point corresponding to the one of the user IDs accessing to the network server is equal to or lower than the threshold value; and providing the selected one of the message types having the layout including the one or more objects to the one of the user terminals which accesses through the one of the user IDs to the network server.

9. The method of claim 8, wherein:

the scoring of the second convertibility points comprises scoring the second convertibility points corresponding to the user IDs, respectively, according to comparison between the actions of the user terminals on the web pages and the predetermined user event stored in the database, and the selecting of the one of the plurality of message types comprises selecting the one of the plurality of message types for the one of the user IDs according to comparison between a predetermined threshold value and the one of the second convertibility points corresponding to the one of the user IDs.

10. The method of claim 8, wherein the first convertibility points indicate indexes correlating the actions of the user terminals to the plurality of message types.

11. The method of claim 8, wherein the selecting of the one of the plurality of message types comprises selecting one of the message types having a highest first convertibility point among the one group of the first message types when the second convertibility point of the one of the user IDs is higher than the threshold value.

12. The method of claim 8, wherein the selecting of the one of the plurality of message types comprises selecting one of the message types having a highest first convertibility point among the another group of the second message types when the second convertibility point of the one of the user IDs is equal to or lower than the threshold value.

13. The method of claim 8, wherein the scoring of the first convertibility points comprises:

score convertibility points of a first type corresponding to the plurality of message types, respectively, according to whether the actions of the user terminals on the web pages are matched with first events; and score convertibility points of a second type corresponding to the plurality of message types, respectively, according to whether the actions of the user terminals on the web pages are matched with second events, wherein the first convertibility points comprise the convertibility points of the first type and the convertibility points of the second type, wherein the selecting of one from the one group of the first message types comprises selecting one from the one group of the first message types based on the convertibility points of the first type corresponding to the plurality of message types if the second convertibility point corresponding to the one of the user IDs accessing to the network server is higher than the threshold value, and wherein the selecting of one from the another group of the second message types comprises selecting one from the another group of the second message types based on the convertibility points of the second type corresponding to the plurality of message types if the second convertibility point corresponding to the one of the user IDs accessing to the network server is equal to or lower than the threshold value.

* * * * *